United States Patent [19]

McCaskey, Jr. et al.

[11] 4,263,373

[45] Apr. 21, 1981

[54] METHOD OF MAKING AN ULTRA THIN GLUE ADHERABLE DECORATIVE LAMINATE

[75] Inventors: Harold O. McCaskey, Jr.; Daniel L. Cannady, Jr., both of Allendale, S.C.

[73] Assignee: Westinghouse Electric Corp., Pittsburgh, Pa.

[21] Appl. No.: 800,124

[22] Filed: May 24, 1977

[51] Int. Cl.$^3$ .............................................. B32B 27/08
[52] U.S. Cl. .................................... 428/531; 156/90; 156/277; 156/278; 156/307.5; 156/307.7; 156/315; 156/335; 427/209; 427/411; 428/535
[58] Field of Search ................. 156/90, 310, 277, 315, 156/278, 335, 306; 427/209, 411; 428/531, 535; 498; 536/3

[56] References Cited

U.S. PATENT DOCUMENTS

| | | | |
|---|---|---|---|
| 1,597,539 | 8/1926 | Novotny et al. | 156/90 |
| 2,118,549 | 5/1938 | Cochrane | 428/531 |
| 2,631,960 | 3/1953 | Bafter | 156/278 |
| 3,050,434 | 8/1962 | Emily et al. | 156/289 |
| 3,075,863 | 1/1963 | Frey | 156/90 |
| 3,135,643 | 6/1964 | Michl | 156/278 |
| 3,378,433 | 4/1968 | Palazzolo et al. | 156/310 |
| 3,418,189 | 12/1968 | Grosheim | 156/277 |
| 3,547,767 | 12/1970 | Keeling et al. | 428/203 |
| 3,620,899 | 11/1971 | Kelly et al. | 260/17.4 ST |
| 3,701,706 | 10/1972 | Giddings et al. | 156/288 |
| 3,756,901 | 9/1973 | Veneziale | 428/220 |
| 3,995,090 | 11/1976 | Clendenin | 427/391 |

*Primary Examiner*—John J. Gallagher
*Attorney, Agent, or Firm*—D. P. Cillo

[57] ABSTRACT

An ultra thin laminate is made by: (1) assembling a laminate stack-up consisting of: one paper sheet having a top decorative surface and a bottom surface coated with a resinous film, about 0.25 mil to about 5 mil thick, effective to opacify the paper and provide a barrier to resin flow, and one abrasion resistant protective overlay sheet disposed in contact with the decorative surface of the paper sheet; (2) heat and pressure consolidating the stack-up to form a unitary decorative laminate having a thickness of between about 5 mil and about 15 mil, and having a resinous film on one side that is glue adherable.

7 Claims, 1 Drawing Figure

U.S. Patent    Apr. 21, 1981    4,263,373
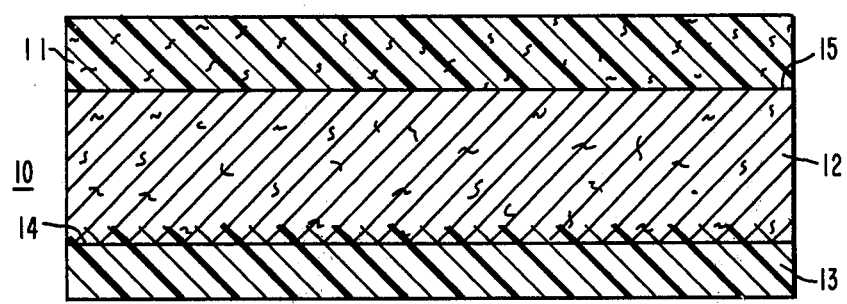

METHOD OF MAKING AN ULTRA THIN GLUE ADHERABLE DECORATIVE LAMINATE

BACKGROUND OF THE INVENTION

Thin decorative veneer laminates are well known in the art. Veneziale, for example, in U.S. Pat. No. 3,756,901, taught 13 mil to 24 mil thick decorative laminates, made from one sheet each of glass fiber overlay and kraft paper support, the kraft paper having a printed design, and each sheet being impregnated with at least 55 weight percent of a polyester resin. The kraft paper back of these types of laminates is then generally sanded to provide an adherable, glueable surface, which can be glued to a chipboard or other type support base. In many cases, during the sanding operation, the thin laminates crack or break in half, adding to production costs.

Keeling, in U.S. Pat. No. 3,547,767, attempted to produce highly flexible veneer laminates having good body and better glueability. Keeling made 7 mil to 10 mil thick decorative laminates. These were made from a transparent thermoplastic film, back-printed with a design, bonded to from 1 to 4 core sheets of rubberized kraft paper. The kraft paper was impregnated and coated with about 55 weight percent of a vinyl halide latex and/or a nitrile rubber latex composition.

In another area, thin release sheets for use between laminate stack-ups in a press, have been taught by Emily et al., in U.S. Pat. No. 3,050,434. These release sheets are made of a paper sheet which may be impregnated with a phenolic resin and which is coated on one side with sodium alginate or potassium alginate. The paper side of the release sheet will adhere to the core layer of one of the consolidated laminate stack-ups after pressing. The adhering paper-alginate sheet is then generally sanded off the core layer of the consolidated laminate. In that patent, the alginate acted as a release coating on kraft paper.

What is needed is a method of making decorative veneer laminates, having thicknesses of between about 5 mil to 15 mil and having an adherable surface, which can be glued to a chipboard base without requiring sanding or other preparation.

SUMMARY OF THE INVENTION

The above problems have been solved and the above need met by printing a decorative design on one side of a sheet of paper, and coating the other side with a resinous film, preferably an alginate film. The decorative side of the paper sheet is then laminated to a protective overlay sheet, to provide a two sheet consolidated decorative laminate. An alginate film was found to provide a highly glueable surface. This abrasion resistant veneer laminate could be made in thicknesses of between about 5 mil (0.005 inch) to about 15 mil, and did not require sanding or other surface preparation before glueing to a chipboard or other suitable support.

BRIEF DESCRIPTION OF THE DRAWING

For a better understanding of the invention, reference may be made to the preferred embodiment, exemplary of the invention, shown in the accompanying drawing, which is a cross-sectional view of a laminate having a single support protective overlay sheet, made by the method of this invention.

DESCRIPTION OF THE PREFERRED EMBODIMENTS

Referring to the drawing, a consolidated decorative laminate 10 is shown, consisting of a single, top, abrasion resistant, protective overlay sheet 11, and a single paper decorative support sheet 12 having an adherable, opaque, resin blocking bottom surface coating 13 which partly impregnates the paper support sheet at 14. The support sheet has a top decorative surface 15. The abrasion overlay resistant sheet may be a sheet of fine paper, about 2 mil to about 5 mil thick, which has been impregnated with a thermosetting resin, such as a melamine-formaldehyde resin or other triazine-aldehyde resin, urea-formaldehyde resin, thiourea-formaldehyde resin, unsaturated polyester resin and the like.

The overlay sheet may also contain small amount of particulate filler, such as finely divided silica or other material which has a refractive index similar to the paper and melamine resin, effective to provide improved abrasion resistance. The overlay sheet may also be a thin plastic film of, for example, polyacrylate, polyvinyl fluoride, polyvinyl chloride, polyvinylidene fluoride, polyurethane or polycarbonate, about 2 mil to about 5 mil thick.

The support sheet may be a thin sheet of paper, such as bleached and unbleached, sulfate or sulfite kraft, alipha cellulose rag paper, but preferably bleached kraft paper, about 3 mil to about 10 mil thick, having a basis weight of between about 10 lb. to about 250 lb. per ream (3,000 sq. ft.). The support sheet may be resin free, or it may be partly impregnated with a resin, such as phenolic resin. One side of the support sheet will be colored or have a printed or other decorative design, such as a wood grain pattern. In the method of this invention only one overlay sheet and only one support sheet are used, in order to provide an ultra thin laminate.

The aminotriazine-aldehyde resins used to impregnate the overlay sheet are well known in the art, and reference may be made to U.S. Pat. No. 3,392,082 for exhaustive details on their production. Similarly, complete details on the phenolic resins which may be used to impregnate the decorative support sheet can be found in U.S. Pat. No. 2,383,430.

The overlay and decorative support sheet are impregnated using standard techniques. The overlay sheet can be impregnated with a solution of aminotriazine-aldehyde resin, generally a melamine-formaldehyde resin, to give a resin content of between about 30 and 75 percent by weight, based on the total dry weight of the impregnated sheet, and then dried to a stage where the volatile content is between about 2 and 10 percent. The decorative support sheet may be impregnated with a solution of phenolic resin to give a resin content of between about 20 and 40 percent by weight, based on the total dry weight of the impregnated sheet, and then dried to a stage at which the resin is only partly cured and has a volatile content of between about 4 and 15 percent.

The surface of the support sheet opposite the decorative surface is coated with a resinous, opaque, resin blocking layer, preferably an alginate film, preferably selected from sodium alginate, potassium alginate, iron alginate, ammonium alginate, lithium alginate, their equivalents, and mixtures thereof. These alginate materials are salt derivatives of alginic acid and are commercially available in liquid form. The liquid alginate can be applied to the support sheet by any suitable technique, such as brushing or roller application, effective to allow the alginate to penetrate partly into the support sheet, and to also form a film on its surface about 0.25 mil to about 5 mil thick after drying. This film provides a glue adherable surface.

The alginate present within the support sheet is effective to act as a barrier, blocking any resin flow through the support from the opposite side of the paper. The alginate is also effective to help give the support paper adequate opacity, so as to make the uncoated top surface suitable for printing. The alginate content within and on the bottom side of the support sheet will generally range from between about 2 and about 40 percent by weight, based on the total dry weight of the coated, impregnated or resin free support sheet.

In the method of this invention, a single protective overlay sheet is placed on top of, in contact with, and next to the decorative surface of a single paper sheet, having its opposite surface coated with the resin blocking film, about 0.25 mil to about 5 mil thick, having glue adherable, bondable properties. This two layer stack-up is then heat and pressure consolidated in a press, to form a unitary laminate having a thickness of between about 5 mil to about 15 mil. This laminate is capable of being bonded to a thick support substrate, such as 10 mil to 750 mil thick chipboard, hardboard, plywood, pressboard, plastic, etc., by direct glueing to the alginate film with any suitable glue or adhesive, without any sanding or other surface preparation, to form an adhesive bonded composite.

High pressure laminating techniques are usually employed in preparing the laminates from the above described assembly, i.e., temperatures ranging from about 100° C. to about 200° C. and pressures ranging from about 500 psi. to about 2,000 psi. The time required to effect a cure of the resinous components of the assembly will usually be from about 15 minutes to about 60 minutes, depending on the pressures and temperatures used. The press and resulting heat and pressure consolidated laminate are allowed to cool to about 40° C. to 85° C. before the press is released and the laminates removed.

EXAMPLE

Two laminate stack-ups were made. Two 12 in.×18 in. sheets of 68 lb. basis weight bleached kraft pulp paper, having a thickness of about 5 mil (0.005 in.), were coated on one side with a sodium alginate film. The alginate was brushed on as a 1% solids aqueous solution which penetrated the paper surface. The coated film was then dried in an oven. The film after drying was about 0.5 mil to about 2 mil thick. These coated sheets were used as the decorative support sheets. Th alginate provided an opaque, resin blocking barrier within the paper.

The side opposite the alginate coating was printed with a three-color decorative wood grain pattern. A 12 in.×18 in. protective overlay sheet of 20 lb. basis weight alpha cellulose paper, about 3 mil thick, impregnated with approximately 60 wt.% to 70 wt.% of melamine formaldehyde resin, was placed on each of the decorative printed surfaces of the support sheets. This provided two, double sheet laminate stack-ups.

The two stack-ups were then placed in a press to be molded. One stack-up was placed overlay face down on a ⅛ in. thick stainless steel pressing plate. The other stack-up was placed alginate face down on top of the alginate face of the bottom stack-up. The opposing alginate films were not adherable to each other. A top steel pressing plate was placed on the overlay sheet of the top stack-up and the press closed.

The laminate stack-ups were molded in the press at 1,000 psi. and 150° C. for 30 minutes. Then the stack-ups were cooled to 55° C. while under pressure. The press was opened and the completely consolidated laminates were removed. They easily separated from each other. The decorative laminates were about 8 mil thick, and had an alginate film about 0.5 mil to about 1 mil thick. The protective layer of these decorative laminates passed abrasion resistance tests for 200 cycles (NEMA LD 1-2.01).

A polyvinyl glue was applied to the alginate coated side of one of the decorative support veneers, and the side was glued to a 500 mil piece of chipboard. After drying, the composite passed bond strength and impact resistance tests. No sanding was used on the alginate surface. The alginate surface provided a glueable, bondable surface, and allowed the deocrative laminate to be bonded directly to the thick chipboard without additional, costly operations. Equally successful decorative laminates were made using phenolic resin impregnated paper sheets coated with alginate. Other resins could also be used to impregnate the overlay sheet, or a plastic film could be used as the overlay sheet.

We claim:

1. A method of making an ultra thin, glue adherable, high pressure decorative thermoset veneer laminate, comprising the steps of:
   (A) assembling a laminate stack-up consisting of:
      (1) one thermosetting resin impregnated paper sheet having a top decorative surface, and a bottom surface coated with an alginate resinous film, about 0.25 mil to about 5 mil thick, to an alginate content of from between about 2 weight percent and about 40 weight percent of the coated paper sheet, said film being effective to opacify the paper sheet and provide a barrier to resin flow, and
      (2) one thermosetting resin impregnated abrasion resistant, protective overlay sheet disposed in contact with the decorative surface of the paper sheet,
   (B) placing the stack-up in a press and molding the stack-up at temperatures of between about 100° C. and about 200° C. and pressures of between about 500 psi. and about 2,000 psi., and
   (C) cooling and releasing the press and removing the stack-up; wherein the stack-up is heat and pressure consolidated to form a unitary decorative laminate, the laminate having a thickness of between about 5 mil and about 15 mil and a resinous film on one side that is glue adherable without sanding.

2. The method of claim 1, wherein the resinous film coating on the paper sheet is an alginate film selected from the group consisting of sodium alginate, potassium alginate, iron alginate, ammonium alginate, lithium alginate and mixtures thereof.

3. The method of claim 1, wherein the paper sheet has a printed decorative surface, is about 3 mil to about 10 mil thick and the stack-up is molded for about 15 minutes to about 60 minutes before cooling.

4. The method of claim 1, wherein the abrasion resistant protective overlay sheet is about 2 mil to about 5 mil thick.

5. The method of claim 4, wherein the overlay sheet is paper sheet and the decorative paper sheet is impregnated with a phenolic resin.

6. The method of claim 4 also including the additional steps of applying an adhesive directly to the alginate film and glueing the decorative laminate to a thick support to form an adhesive bonded composite.

7. The decorative laminate made by the method of claim 4.

* * * * *